United States Patent
Ouchi

(10) Patent No.: US 8,743,472 B2
(45) Date of Patent: Jun. 3, 2014

(54) LENS DEVICE

(71) Applicant: FUJIFILM Corporation, Tokyo (JP)

(72) Inventor: Shunichiro Ouchi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/031,688

(22) Filed: Sep. 19, 2013

(65) Prior Publication Data

US 2014/0022652 A1  Jan. 23, 2014

Related U.S. Application Data

(63) Continuation of application No. PCT/JP2012/056834, filed on Mar. 16, 2012.

(30) Foreign Application Priority Data

Mar. 24, 2011  (JP) .................. 2011-066445

(51) Int. Cl.
| | |
|---|---|
| *G02B 15/14* | (2006.01) |
| *G02B 7/10* | (2006.01) |
| *G02B 7/105* | (2006.01) |
| *G02B 7/02* | (2006.01) |

(52) U.S. Cl.
CPC *G02B 7/102* (2013.01); *G02B 7/10* (2013.01); *G02B 7/105* (2013.01); *G02B 7/02* (2013.01); *G02B 7/023* (2013.01)
USPC ........... 359/694; 359/699; 359/704; 359/706; 359/819; 359/822

(58) Field of Classification Search
CPC .......... G02B 7/102; G02B 7/10; G02B 7/105; G02B 7/02; G02B 7/023
USPC .................. 359/694, 699, 704, 706, 819, 822
See application file for complete search history.

(56) References Cited

U.S. PATENT DOCUMENTS

| | | | |
|---|---|---|---|
| 6,204,979 B1 | 3/2001 | Matsui | |
| 7,734,163 B2 * | 6/2010 | Maeda et al. | ................... 396/87 |

FOREIGN PATENT DOCUMENTS

| | | |
|---|---|---|
| JP | 2000-066076 | 3/2000 |
| JP | 2000-193868 | 7/2000 |
| JP | 2002-196204 | 7/2002 |
| JP | 2002-283082 | 10/2002 |
| JP | 2004-184744 | 7/2004 |
| JP | 2005-070417 | 3/2005 |

OTHER PUBLICATIONS

International Search Report, PCT/JP2012/056834, Jun. 19, 2012.
Written Opinion, PCT/ISA/237, Jun. 19, 2012.

* cited by examiner

*Primary Examiner* — Ricky Mack
*Assistant Examiner* — Daniele Manikeu
(74) *Attorney, Agent, or Firm* — Young & Thompson

(57) ABSTRACT

An adjustment jig is inserted into an opening and an opening, and a screw provided on an inner lens frame holding a correcting lens is rotated. With the rotation of the screw, a front end of the inner lens frame moves in a direction toward an optical axis or radially outside the correcting lens. With this, the inner lens frame is moved in a direction toward the optical axis or radially outside the correcting lens, and the tilt of the correcting lens is decreased.

8 Claims, 3 Drawing Sheets

LENS DEVICE

CROSS-REFERENCE TO RELATED APPLICATIONS

This application is a PCT Bypass continuation application and claims the priority benefit under 35 U.S.C. §120 of PCT Application No. PCT/JP2012/056834 filed on Mar. 16, 2012 which application designates the U.S., and also claims the priority benefit under 35 U.S.C. §119 of Japanese Patent Application No. 2011-066445 filed on Mar. 24, 2011, which applications are all hereby incorporated in their entireties by reference.

BACKGROUND OF THE INVENTION

1. Field of the Invention

The presently disclosed subject matter relates to a lens device and, in particular, a technology of adjusting falling of a lens in a barrel.

2. Description of the Related Art

Japanese Patent Application Laid-Open No. 2002-196204 discloses a lens barrel in which eccentricity adjustment can be performed on a lens holding frame, that is, a lens group, in a stepless manner by loosening a screw and, on the other hand, falling adjustment can be performed on the lens group in a stepless manner by changing an amount of loosing or an amount of fastening of the screw.

However, when the falling is adjusted by using the screw as described in Japanese Patent Application Laid-Open No. 2002-196204, only the lens positioned in front or rear of an optical system can be adjusted.

By contrast, Japanese Patent Application Laid-Open No. 2004-184744 and Japanese Patent Application Laid-Open No. 2000-066076 describe that a jig such as a driver is inserted from a hole formed on a barrel and a screw or pin screwed in a lens frame is rotated to adjust tilt and eccentricity of a lens. With this, the tilt and eccentricity of a lens disposed in a course of an optical system can also be easily adjusted, without disassembling the lens barrel.

SUMMARY OF THE INVENTION

However, in Japanese Patent Application Laid-Open No. 2004-184744, the frame is pushed directly with a flat screw to tilt the lens, which poses a problem such that the operation of the flat screw becomes heavy depending on the amount of screwing of the flat screw.

Also, in Japanese Patent Application Laid-Open No. 2004-184744, a thin-walled portion is formed so as to allow elastic deformation, and a lens group is mounted via the thin-walled portion. Therefore, there is a possibility that an inconvenience occurs in mounting the lens group due to an impact or the like. Moreover, the bottom of the thin-walled portion deteriorates with time, thereby possibly posing an inconvenience in mounting the lens group.

In Japanese Patent Application Laid-Open No. 2000-066076, the tilt is corrected by rotating the eccentric screw to move the lens frame in an optical axis direction. For this reason, there is a problem such that the lens group moves in the optical axis direction when tilt correction is performed. Moreover, the amount of movement in a diameter direction is smaller compared with the amount of movement in the optical axis direction, thereby posing a problem such that the falling cannot be easily adjusted.

The presently disclosed subject matter was made in view of these circumstances, and has an object of providing a lens device in which falling can be easily adjusted without moving a lens group in an optical axis direction.

A lens device according to an aspect of the presently disclosed subject matter includes an approximately cylindrical first lens frame having a lens group supported therein, a second lens frame having a cylindrical part with an inner diameter larger than an outer perimeter of the first lens frame, an annular member to be mounted on the first lens frame, an elastic member disposed between the first lens frame and the second lens frame, and a cylinder having the second lens frame fixed thereto, wherein with the second lens frame being interposed between the annular member and the elastic member, the second lens frame is mounted on the first lens frame so that the cylindrical part covers the first lens frame, a projection is formed on the first lens frame or the second lens frame so that the first lens frame and the second lens frame are circumferentially in contact with each other in a plane including an optical axis, screw holes radially penetrating through the second lens frame are formed on the second lens frame in the plane including the optical axis and at a position a predetermined distance away from a position where the first lens frame and the second lens frame are in contact with each other, and, to the screw holes, a screw capable of pressing an outer circumferential surface of the first lens frame is screwed.

According to the lens device in accordance with the aspect described above, by interposing the second lens frame between the annular member to be mounted on the approximately cylindrical first lens frame having the lens group supported therein and the elastic member disposed between the first lens frame and the second lens frame, the second lens frame is mounted on the first lens frame. On the second lens frame, the screw hole is formed at the position the predetermined distance away from the position where the first lens frame and the second lens frame are in contact with each other in the plane including the optical axis. With the screw screwed to the screw hole, the outer circumferential surface of the first lens frame is pressed. With this, the first lens frame rotates with the position in contact with the second lens frame as a base point, and the tilt of the first lens frame, that is, the lens group, can be corrected.

In the lens device in accordance with the aspect described above, the screw holes may be formed at four positions so as to be spaced apart at approximately 90 degrees. With this, falling adjustment can be carried out at four positions spaced apart at approximately 90 degrees, for example, at above, below, left, and right positions.

In the lens device in accordance with the aspect described above, the cylinder may have a first opening formed thereon, the first opening from which the screw holes are exposed.

With this, the screw hole is exposed via the first opening. Therefore, the amount of screwing of the screw can be adjusted from the opening by using a jig or the like, without disassembling the lens device.

In the lens device in accordance with the aspect described above, the lens group may be moved in an optical axis direction with rotation of the cylinder. That is, tilt adjustment is performed on a moving lens group moving in the optical axis direction with rotation of the cylinder. In this case, a non-rotating cylinder may be disposed outside the rotating cylinder, and the non-rotating cylinder also requires an opening.

According to the presently disclosed subject matter, the falling can be easily adjusted without moving the lens group in the optical axis direction.

DETAILED DESCRIPTION OF THE EMBODIMENTS

Figure 1:
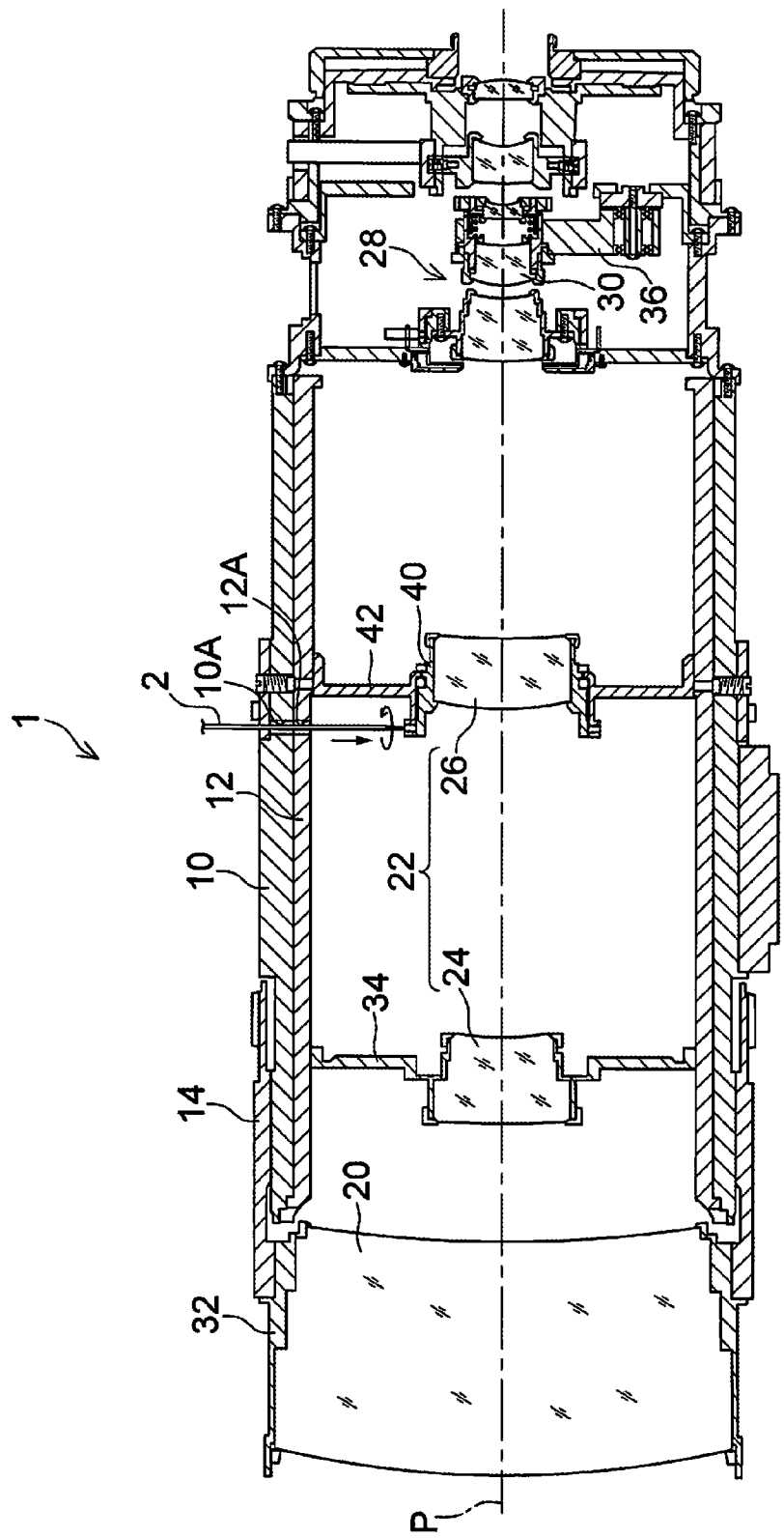
FIG. 1 is a schematic sectional view of a lens barrel according to an embodiment of the presently disclosed subject matter sectioned along a plane including an optical axis.

Embodiments of the lens device according to the presently disclosed subject matter are described below according to the attached drawings. FIG. 1 is a schematic view of a lens barrel of an imaging lens for a television camera according to an embodiment of the presently disclosed subject matter. FIG. 1 is a schematic sectional view of a lens barrel sectioned along a plane including an optical axis. A rear end of (on a right side in FIG. 1) of a lens barrel 1 is mounted on a camera body not shown.

In the lens barrel 1, a focus lens group 20, a zoom lens group 22, and a master lens group 28 are disposed. And, between the zoom lens group 22 and the master lens group 28, a diaphragm (not shown) is disposed.

The focus lens group 20 includes three lenses, by way of example. The focus lens group 20 is supported by a focus lens barrel 32. The focus lens barrel 32 is supported on a body ring 10 via a ring 14 so as to be movable in a front and rear direction of an optical axis P. Therefore, when a focus ring (not shown) is rotated, the focus lens barrel 32 is rotated accordingly, and the focus lens group 20 is driven in the front and rear direction of the optical axis P. With this, focus adjustment is carried out.

On the other hand, a cam cylinder 12 is rotatably disposed inside the body ring 10. The cam cylinder 12 has the zoom lens group 22 disposed therein. The zoom lens group 22 includes a variable power lens 24 and a correcting lens 26.

The variable power lens 24 is held by a variable power lens frame 34. The variable power lens frame 34 has a cam pin (not shown) fitting therein, and this cam pin penetrates through a cam groove (not shown) formed in the cam cylinder 12 to fit in a rectilinear groove (not shown) formed on an inner circumferential surface of the body ring 10. The correcting lens 26 is held by an inner lens frame 40. The inner lens frame 40 is mounted on the outer lens frame 42. The outer lens frame 42 has a cam pin (not shown) fitting therein, and this cam pin penetrates through a cam groove (not shown) formed in the cam cylinder 12 to fit in a rectilinear groove (not shown) formed on an inner circumferential surface of the body ring 10. Therefore, when a zoom ring (not shown) is rotated, the cam cylinder 12 is rotated accordingly, thereby driving the variable power lens 24 and the correcting lens 26 in the front and rear direction of the optical axis P. With this, zoom adjustment is carried out.

The master lens group 28 is movably disposed along the optical axis P. With the master lens group 28 moved along the optical axis P, focus correction is carried out. Also, the master lens group 28 is subjected to movement control at the time of fine adjustment (also referred to as tracking adjustment or flange focal length adjustment) of a lens imaging position and macro photography.

The master lens group 28 includes a movable extender group 30 for switching an imaging power between one and predetermined fold (for example, twofold). The extender group 30 is disposed at a front end of an arm 36. When the arm 36 is rotated, the extender group 30 is inserted into and removed from the optical axis P.

Figure 2:
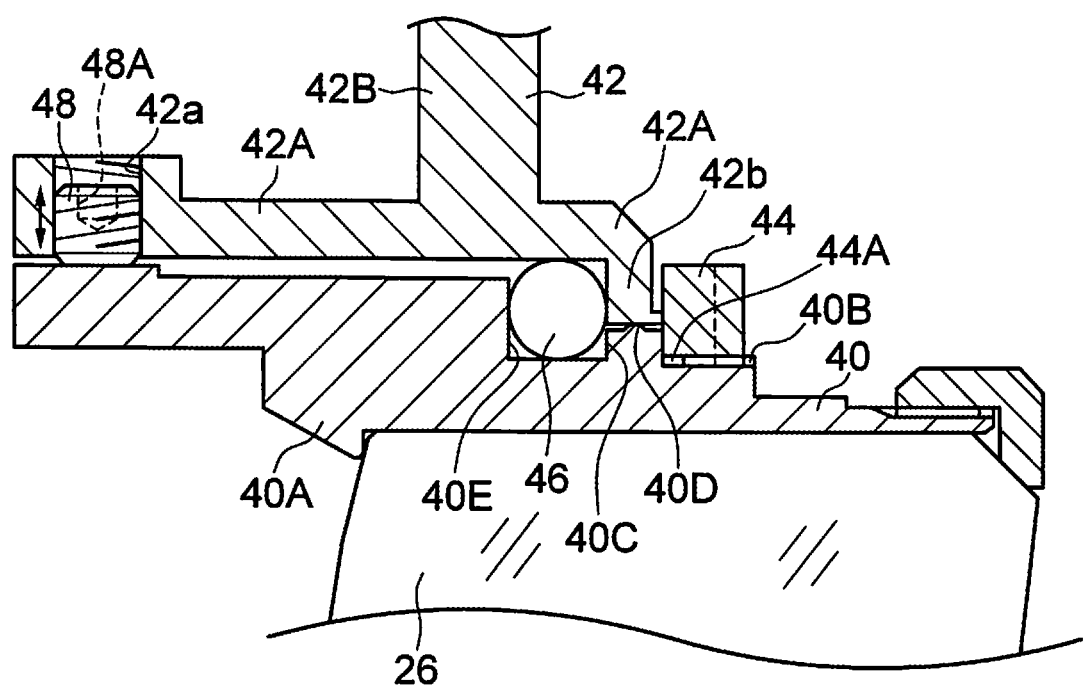
FIG. 2 is a partially enlarged view of the lens barrel.

The lens barrel 1 of the present embodiment has a structure for adjusting the falling of the correcting lens 26. FIG. 2 is an enlarged view depicting details of falling adjustment mechanisms which adjust the falling of the correcting lens 26. The falling adjustment mechanisms are disposed at every approximately 90 degrees at four positions, that is, above, below, left, and right, when viewed from a front end (or a rear end) of the lens barrel 1. While only a falling adjustment mechanism disposed above (on an upper side in FIG. 1) is depicted in FIG. 2, the falling adjustment mechanisms disposed below, left, and right also have the same structure. Note that description of the falling adjustment mechanisms disposed below, left, and right is omitted.

The inner lens frame 40 is a member in an approximately cylindrical shape, and has an inner circumferential surface where a click part 40A held by the correcting lens 26. The inner lens frame 40 has an outer circumferential surface where a screw part 40B is formed. Also, on the outer circumferential surface of the inner lens frame 40, a rib 40C is formed so as to be adjacent to the screw part 40B. A projection 40D in an R shape in section is formed radially outside (at a front end of) the rib 40C. Note that the click part 40A, the screw part 40B, and the rib 40C may be formed all around the perimeter, or may be formed at each position where the falling adjustment mechanism (in the present embodiment, above, below, left, and right). Also, the projection 40D may be any as long as the projection 40D has an R shape in section, and the other shapes are not restrictive. For example, four projections each in a semicircular shape may be formed, or a rib having an R shape in section may be formed.

A recessed part 40E is formed over the entire perimeter at a position adjacent to the rib 40C on the outer circumferential surface of the inner lens frame 40, and an elastic member 46 fits in the recessed part 40E. While an O ring is used as the elastic member 46 in the present embodiment, this is not meant to be restrictive.

The outer lens frame 42 includes an approximately cylindrical body part 42A having an inner diameter larger than the outer diameter of the inner lens frame 40 and a projecting part 42B formed so as to project from the body part 42A in a vertical direction. The outer lens frame 42 is disposed so as to cover the inner lens frame 40. Also, a cam pin (not shown) fits in radially outside the projecting part 42B.

Near a front end (on a left side in FIG. 2) of the body part 42A, a screw hole 42a is formed so as to radially penetrate through the body part 42A, and to the screw hole 42a, a screw 48 is screwed. The screw 48 has a front end where a hole 48A into which a jig is inserted is formed. The screw hole 42a is formed at each of the positions where the falling adjustment mechanisms are arranged (in the present embodiment, above, below, left, and right). Note that the position of the screw hole 42a is preferably formed at a position as far as possible away from the screw part 40B (or a pressing ring 44) in an assembled state, that is, near the front end of the body part 42A.

At a rear end (on a right side in FIG. 2) of the body part 42A, a rib 42b projecting radially inward is formed. The rib 42b may be formed over the entire perimeter, or may be formed at each position where the falling adjustment mechanism is arranged (in the present embodiment, above, below, left, and right).

The pressing ring 44 is an annular member, and has an inner circumferential surface where a screw part 44A that can be screwed to the screw part 40B is formed over the entire perimeter.

The above-structured falling adjustment mechanism is assembled as follows. Firstly, the outer lens frame 42 is disposed inside the body ring 10. Next, the inner lens frame 40 is inserted from a front end side (a left side in FIG. 2) into the inside of the external lens frame 42. Then, the pressing ring 44 is inserted from a rear end side (a right side in FIG. 2) to be screwed to the screw part 40B. The pressing ring 44 is screwed until the pressing ring 44 abuts on the rib 40C. As a result, the elastic member 46 is deformed as being pressed by a side surface wall of the recessed part 40E and a side surface of the rib 42b and, by its reactive force, the rib 42b is interposed between the elastic member 46 and the pressing ring 44. With this, the inner lens frame 40 is mounted on the outer lens frame 42.

The screw part 40B is formed so that, in the assembled state, the position of the front tip of the pressing ring 44 (a left side in FIG. 2) approximately coincides with the position of the principal point of the correcting lens 26. Also, in this assembled state, the outer lens frame 42 abuts only on the front tip of the projection 40D. Therefore, on the plane including the optical axis as depicted in FIG. 1 and FIG. 2, the inner lens frame 40 and the outer lens frame 42 are in contact with each other in a circumferential shape (in contact with a circumferential line or in contact with a plurality of points arranged in a circumferential shape).

A method of adjusting the falling of the correcting lens 26 by using the above-structured adjustment mechanism is described. By rotating the cam cylinder 12, an opening 10A formed on the body ring 10 and an opening 12A formed on the cam cylinder 12 are caused to coincide with each other (refer to FIG. 1). With this, the screw hole 42a is exposed via the opening 10A and the opening 12A.

An adjustment jig 2 is inserted into the opening 10A and the opening 12A, a front end of the adjustment jig 2 is inserted into the hole 48A formed on the screw 48, and the screw 48 is rotated. When the amount of screwing of the screw 48 is increased, the screw 48 moves radially inward, and a portion near the front end of the inner lens frame 40 is moved accordingly in a direction toward the optical axis.

The inner lens frame 40 is in contact with the outer lens frame 42 at a front end of the projection 40D. Therefore, when the portion near the front end of the inner lens frame 40 is moved by the screw 48 in the optical axis direction, the inner lens frame 40 rotates about the front end of the projection 40D as a fulcrum, and the correcting lens 26 also rotates accordingly. Note that the inner lens frame 40 can be rotated with the elastic member 46 being elastically deformed. Also, although the pressing ring 44 abuts on the outer lens frame 42, an abutting portion is not fixed, and therefore, flexibility of tilting of the inner lens frame 40 at a fine angle is ensured.

In FIG. 2, when the amount of screwing of the screw 48 is increased, the inner lens frame 40 rotates counterclockwise, and the correcting lens 26 rotates counterclockwise accordingly. With this, an adjustment is made so that the optical axis of the correcting lens 26 is directed in a direction diagonally downward with respect to the optical axis P.

When the amount of screwing the screw 48 is decreased, the screw 48 retreats radially outside the screw 48. With resilience of the elastic member 46, the inner lens frame 40 is moved in a direction back to the original, and the tilt of the correcting lens 26 with respect to the optical axis P is decreased.

Since the falling adjustment mechanism is structured as described above, even when the inner lens frame 40 is rotated at a fine angle, the position of the pressing ring 44 in the optical axis direction is not changed. That is, the tilt of the correcting lens 26 is adjusted with the principal point as an approximate center. Therefore, the correcting lens 26 is not moved in the optical axis direction, and the angle of view is not changed even with a falling adjustment.

Also, as the distance between the screw hole 42a and the pressing ring 44 is longer, the falling of the correcting lens 26 can be adjusted with a smaller force. Furthermore, as the distance between the screw hole 42a and the pressing ring 44 is longer, the amount (angle) of falling with respect to the amount of movement of the screw 48 is smaller. For this reason, the falling can be adjusted with high accuracy.

In the present embodiment, the amount of screwing of the screw, that is, the falling of the lens group, can be adjusted by using a jig or the like without disassembling the lens device. Also, the falling can be adjusted with the principal point as a center, without moving the lens group in the optical axis direction. Furthermore, accurate falling adjustment can be easily performed.

Note that while the screw hole 42a is formed near the front tip (on the left side in FIG. 2) of the body part 42A and the inner lens frame 40 and the correcting lens 26 rotate counterclockwise when the amount of screwing of the screw 48 is increased in the present embodiment, the embodiment of the falling adjustment mechanism is not restricted to this. For example, the position of the screw and the fulcrum of rotation may be reversed in a front and rear direction so that the correcting lens 26 rotates clockwise when the amount of screwing of the screw is increased.

Figure 3:
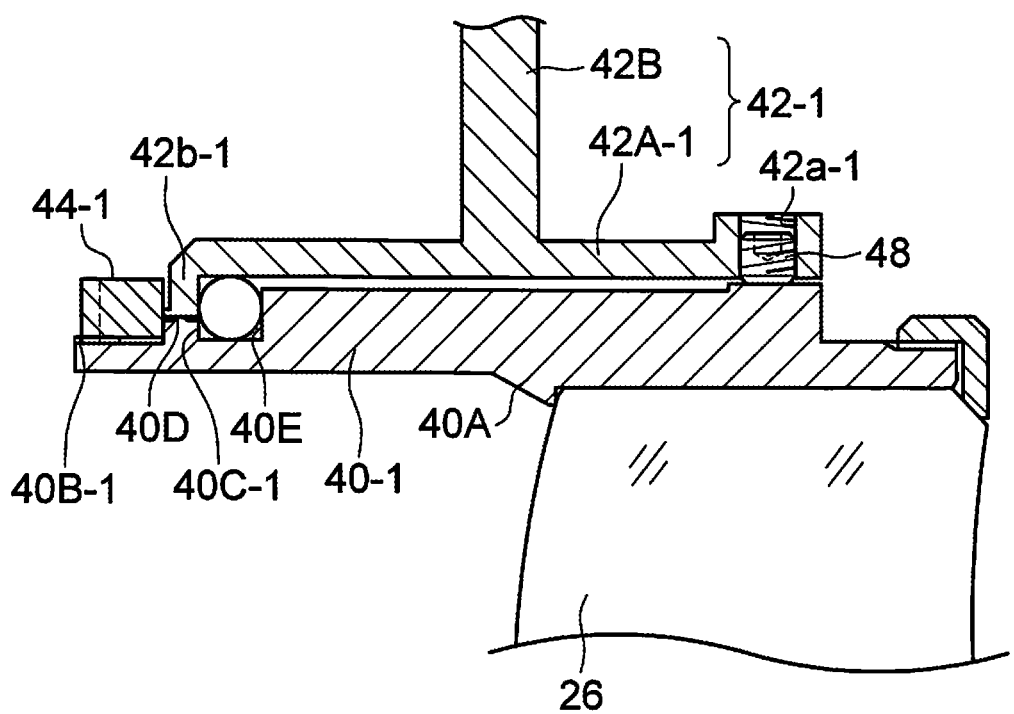
FIG. 3 is a partially enlarged view of a lens barrel of another embodiment.

FIG. 3 is a diagram depicting a different embodiment of the falling adjustment mechanism. An inner lens frame 40-1 has a front end (on a left side in FIG. 3) where a screw part 40B-1 is formed, and a rib 40C-1 is formed so as to be adjacent to the screw part 40B-1. A body part 42A-1 of an outer lens frame 42-1 has a front end where a rib 42b-1 is formed. Also, near a rear end (on a right side in FIG. 3) of the body part 42A-1, a screw hole 42a-1 is formed so as to radially penetrate through the body part 42A-1, and to the screw hole 42a-1, the screw 48 is screwed.

With the outer lens frame 42-1 disposed inside the body ring 10, the inner lens frame 40-1 inserted from the rear end side into the inside of the outer lens frame 42-1, and a pressing ring 44-1 inserted from the front end side to be screwed to the screw part 40B-1, a falling adjustment mechanism is assembled.

When the amount of screwing of the screw 48 is increased, the inner lens frame 40-1 rotates clockwise with the projection 40D as a fulcrum, and the correcting lens 26 rotates clockwise accordingly. With this, an adjustment is made so that the optical axis of the correcting lens 26 is directed in a direction diagonally upward with respect to the optical axis P. When the amount of screwing of the screw 48 is decreased, the screw 48 retreats radially outside (an upper side in FIG. 3), and the inner lens frame 40-1 is moved in a direction back to the original. With this, the tilt of the optical axis of the correcting lens 26 is decreased, and the correcting lens 26 can be rotated at a fine angle.

Note that while the projection 40D is formed on the inner lens frame 40 to cause the inner lens frame 40 and the outer lens frame 42 to make contact with each other in the present embodiment, a projection may be formed on the outer lens frame 42 to cause the inner lens frame 40 and the outer lens frame 42 to make contact with each other.

Also, while the ribs 42b are formed at the positions each where the falling adjustment mechanism is arranged in the present embodiment, the ribs 42b may be disposed at at least two positions, that is, upper and lower ones (or left and right ones).

Furthermore, while an O ring is used as an elastic member in the present embodiment, this is not meant to be restrictive as long as the elastic member serves as a cushion at the time of rotation of the inner lens frame 40 and can be disposed so as to be pressed from both of the inner lens frame 40 and the outer lens frame 42. For example, the recessed part 40E may be eliminated, and an elastic plate-shape member such as a rubber gasket may be affixed.

Still further, while four falling adjustment mechanisms are disposed at every approximately 90 degrees so as to have a vertical and horizontal positional relation in the present embodiment, the number and arrangement of the falling adjustment mechanisms are not restrictive. The number of falling adjustment mechanisms may be two or three as long as it is four or less. When the number of falling adjustment mechanisms is two, the falling adjustment mechanisms are preferably disposed so as to have a positional relation at an approximately 90 degrees (for example, an above and lateral relation). When the of falling adjustment mechanisms is three, the falling adjustment mechanisms are preferably disposed so as to be spaced at an approximately 120 degrees. Even when the number of falling adjustment mechanisms is four, the falling adjustment mechanisms are not restricted to be disposed above, below, left, and right. However, the falling adjustment mechanisms are most preferably disposed at four positions, that is, above, below, left, and right, so that the falling can be vertically and horizontally adjusted. Note that even if more than four falling adjustment mechanisms are disposed, accuracy and ease of falling adjustment are not improved, and therefore disposing more than four falling adjustment mechanisms does not make sense.

Still further, while the falling adjustment mechanism is applied to the correcting lens 26, which is a moving lens, in the present embodiment, the falling adjustment mechanism is not restrictively applied to the correcting lens 26. It may be applied to a moving lens other than the correcting lens 26, and may be applied to a fixed lens not moving in the optical axis direction. In the case of a fixed lens, in place of providing an opening on a cylinder such as a body ring, a long screw may be used to penetrate from the cylinder.

What is claimed is:

1. A lens device comprising:
an approximately cylindrical first lens frame having a lens group supported therein;
a second lens frame having a cylindrical part with an inner diameter larger than an outer perimeter of the first lens frame;
an annular member to be mounted on the first lens frame;
an elastic member disposed between a side wall of a recessed part formed on the outer perimeter of the first lens frame and a rib projecting to an inner perimeter side of the second lens frame; and
a cylinder having the second lens frame fixed thereto, wherein
with the rib of the second lens frame being interposed between the annular member and the elastic member, the second lens frame is mounted on the first lens frame so that the cylindrical part covers at least a part of the first lens frame,
a projection is formed on the first lens frame or the second lens frame, and the first lens frame and the second lens frame are in contact with each other at the projection,
screw holes radially penetrating through the second lens frame are formed on the second lens frame in a plane including an optical axis of the lens group and at a position a predetermined distance away from a position where the first lens frame and the second lens frame are in contact with each other at the projection, and
to the screw holes, a screw capable of pressing an outer circumferential surface of the first lens frame is screwed.

2. The lens device according to claim 1, wherein
the screw holes are formed at four positions so as to be spaced apart at approximately 90 degrees along a circumferential direction of the second lens frame.

3. The lens device according to claim 1, wherein
the cylinder has a first opening formed thereon, the first opening from which the screw holes are exposed.

4. The lens device according to claim 2, wherein
the cylinder has a first opening formed thereon, the first opening from which the screw holes are exposed.

5. The lens device according to claim 1, wherein
the lens group is moved in an optical axis direction with rotation of the cylinder.

6. The lens device according to claim 2, wherein
the lens group is moved in an optical axis direction with rotation of the cylinder.

7. The lens device according to claim 3, wherein
the lens group is moved in an optical axis direction with rotation of the cylinder.

8. The lens device according to claim 4, wherein
the lens group is moved in an optical axis direction with rotation of the cylinder.

* * * * *